April 9, 1963 S. E. LAGER 3,084,652
OBJECT RECOVERY DEVICE
Filed March 20, 1961 2 Sheets-Sheet 1

INVENTOR.
SAMUEL E. LAGER
BY
AGENT
ATTORNEY

April 9, 1963    S. E. LAGER    3,084,652
OBJECT RECOVERY DEVICE
Filed March 20, 1961    2 Sheets-Sheet 2

INVENTOR.
SAMUEL E. LAGER

United States Patent Office 3,084,652
Patented Apr. 9, 1963

3,084,652
OBJECT RECOVERY DEVICE
Samuel E. Lager, La Cumbra Road, Box 385,
Somis, Calif.
Filed Mar. 20, 1961, Ser. No. 97,114
10 Claims. (Cl. 114—.5)
(Granted under Title 35, U.S. Code (1952), sec. 266)

The invention described herein may be manufactured and used by or for the Government of the United States of America for governmental purposes without the payment of any royalties thereon or therefor.

The present invention relates to a method and means for marking the location of floating objects so as to facilitate the subsequent recovery thereof. More specifically, the invention relates in one of its aspects to a device which can be released by an aircraft or surface vessel in the vicinity of a floating object, and which will then "latch on" to the object and remain therewith until such time as a recovery operation can be effected.

Numerous arrangements are known the purpose of which is to indicate the position in a body of water of some object the later recovery of which is desired, the object either being of a buoyant nature or being provided with some form of flotation equipment which causes it to remain on the surface of the water. This object, for example, may be an aircraft which has crashed at such point, or may consist of some portion of a missile or rocket containing instrumentation on which is recorded data concerning the trajectory or performance of the projectile of which it formed a part. Obviously, it is highly desirable to have this information available for evaluation and analysis, and consequently the matter of prompt recovery of such a unit is of extreme importance.

At the present time many floating objects of the above type are not successfully recovered even after their position in a body of water has been ascertained, due to the lack of any means for permanently "pin-pointing" their precise location. Ordinarily, the sighting of such objects is carried out by visual observation from an aircraft. When the pilot of the aircraft observes such an objective, he customarily releases a marker which impacts the surface of the water and then floats thereon to act as a guide for surface vessels which may not reach the area until after a considerable period of time has elapsed. It is apparent that such a method has a number of inherent disadvantages, one of which is that the marker so released will not necessarily remain in the vicinity of the object, especially during adverse weather conditions or in areas where strong tides or currents would cause the marker to drift away from the point at which it was dropped.

It is, of course, possible to overcome these drawbacks by designing the object itself to incorporate a marking device which normally is contained therewithin and is released when the object enters the water. In such cases the marker is attached directly to the object, and hence the problem of drift is not present. However, it is apparent that in many circumstances it is impracticable to include such a device as a part of a missile or rocket, due to the weight and space requirements imposed by the marker per se.

It would be highly desirable to have available a marker of the above type which could be dropped by an aircraft at the point where an object is floating in a body of water, and to ensure that this marker remain with the object until such time as the recovery operation can be completed. However, attempts to devise such a unit have not hitherto been successful, primarily because of the lack of any satisfactory method of causing the marker to become attached to the object with sufficient tenacity to prevent its detachment by waves or current conditions. The present invention, as one of its objectives, incorporates means whereby a marker or beacon can be released from an aircraft in the vicinity of an object the recovery of which is desired, this marker or beacon then becoming a propulsive device which travels on the surface of the water to describe a circular path around the objective. Means are included in the marker assembly whereby the motion of the marker causes a cable or lanyard to be extended therefrom, and the nonlinear motion of the marker results in this lanyard forming a spiral of gradually decreasing radius around the objective. Since the latter is within the area bounded by the lanyard, the gradually decreasing radius of the latter brings about an eventual contact between the lanyard and the object so that the former, in effect, winds around or "ensnares" the latter. Inasmuch as the lanyard is attached at one end to the self-propelled marker unit, this ensnarement of the desired object by the lanyard causes the marker to remain in close proximity to the object, and, since the lanyard is wound around the object, no disengagement of these members has been found to occur under even the most severe weather and/or current conditions.

Although the self-propulsion feature of applicant's marker or beacon is of primary importance in achieving the objectives hereinabove set forth, an added advantage of the arrangement disclosed is that this motion of the marker following its impact in a body of water is achieved without the necessity of providing a power supply of excessive size and/or weight. In accordance with one feature of the invention, the propulsive force for the marker is obtained by utilizing the chemical reaction between water of even a low degree of salinity and some substance such as lithium which is carried within the marker and which is allowed to come in contact with the water after the marker has been dropped by the aircraft on which it is carried. Consequently, the propulsion system of the marker does not become active until a certain period of time after the marker strikes the water, at which point the generation of energy for propulsive purposes is initiated.

It has been found that this same principle employing the chemical reaction between saline water and some suitable substance such as lithium may also be employed to improve the efficiency of the assembly as a beacon by providing power for the generation of electrical energy which is radiated from an antenna carried by the marker, this antenna being automatically extended from the body of the marker after impact of the latter on the surface of the water. This enables any recovery vessel having direction-finding equipment to readily locate the beacon and hence the floating object by normal direction-finding methods.

One object of the present invention, therefore, is to provide an improved form of marker or beacon for locating floating objects, and to provide a method of carrying out the marking operation.

A further object of the invention is to provide a marking device which contains its own source of propulsive power, so that following impact on a body of water the marker will describe a path of nonlinear configuration around the object to be recovered, together with further means for causing the marker to eventually attach itself to the desired object and remain therewith for an extended period of time.

An additional object of the invention is to provide a marker for locating floating objects, such marker being provided with a source of propulsive energy which is water-activatable and hence effective only during the marker's actual utilization in a recovery operation.

Other objects and many of the attendant advantages of this invention will be readily appreciated as the same become better understood by reference to the following detailed description when considered in connection with the accompanying drawings wherein.

Figure 1:
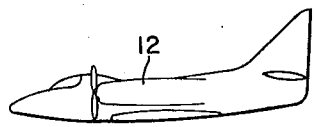
FIG. 1 is a schematic illustration of a marker or beacon designed in accordance with a preferred embodiment of the present invention, as employed during the launching phase of its operational cycle.
Figure 1:
Figure 1:

Referring now to FIG. 1 of the drawings, there is shown a marker or beacon designed in accordance with a preferred embodiment of the present invention, this device being generally designated in the drawings by the reference numeral 10. Marker 10, the constructional details of which will be later described, is intended to be carried by, and launched from, an aircraft 12. The precise manner in which this launching is effected forms no part of the present invention and hence will not be discussed herein. It is only necessary that the marker 10 be releasable by the aircraft pilot in the vicinity of some floating object 14 the recovery of which is desired.

Although the launching operation may be carried out at any point within the general area of the object 14, nevertheless it has been determined that for optimum results it is desirable that the detachment of the marker assembly 10 from plane 12 occur at an elevation above water level of between 20 and 50 feet, and that the launching angle lie within 30 and 45 degrees. Although it is obviously possible to vary, within fairly wide limits, the area within which the device of the present invention will be effective, nevertheless to make certain that the object will be definitely pin-pointed the radial distance within which the marker should impact the surface of the water should not exceed approximately 150 feet from the object as a center.

Figure 2:
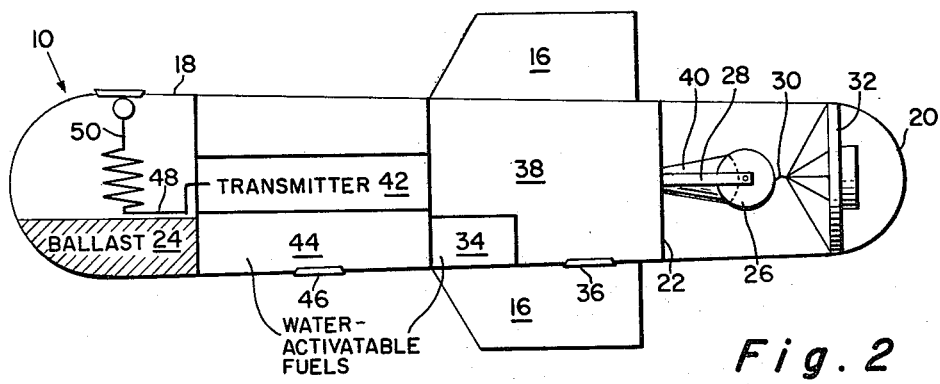
FIG. 2 is a schematic view of a marker unit such as illustrated in FIG. 1, the surface covering of the marker being omitted in order to illustrate the structural details thereof.

In FIG. 2 of the drawings is illustrated a preferred form of construction for the marker unit 10 of FIG. 1. As shown, this marker 10 is generally in the shape of a torpedo having a plurality of radially extending fins 16. The latter serve to stabilize the unit during its movement after impacting the water and prevent it from rotating about its longitudinal axis.

The marker unit 10 is made up of a forward, or nose, section 18 and an aft section 20 which is intended to be separable from the forward portion 18 upon impact. To permit this to occur, the two sections 18 and 20 are joined by a circumferential structural portion 22 which is frangible, or formed to be easily broken away by any lateral force applied to the tail portion 20 such as that which results upon impact of the marker in a body of water.

It is desirable that the marker unit 10 remain upright in the water in order that a radio antenna (to be later described) extend vertically therefrom. Consequently, the unit 10 of FIG. 2 is provided with suitable ballast which is generally designated by the reference numeral 24.

To carry out the objectives of the invention, the tail portion 20 of unit 10 encloses a reel 26 rotatably mounted on a bracket 28 in turn securely attached to the aft portion of the marker body member 18. A lanyard 30 is wound upon the reel 26, and this lanyard 30 has attached to its outer extremity a sea anchor 32. As shown in FIG. 2, the sea anchor 32 is stowed within the aft portion 20 of the marker unit 10 during the time that the former is an integral part of the assembly.

Figure 6:
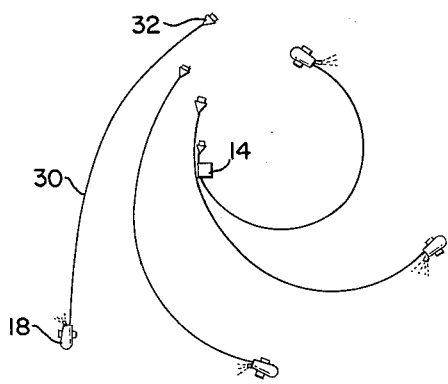
FIG. 6 illustrates the manner in which the marker of applicant's invention, during its propulsion phase, acts to encircle or "ensnare" a floating object.

It is a feature of the present invention that the marker 10 of FIGS. 1 and 2 be self-propelled following its impact upon a body of saline water. To achieve this objective, the forward body portion 18 of the marker carries a mass of some water-activatable fuel such, for example, as lithium. This fuel supply is schematically illustrated in FIG. 2 and designated by the reference numeral 34. To permit the fuel 34 to be contacted by water, a plug 36 is provided which closes an opening in the body portion 18 of the marker. Following the launching phase of operation (as shown in FIG. 1) this plug 36 dissolves or disintegrates and allows water to enter a chamber 38 where it mixes with the fuel 34 to form a gas which is then ejected through a nozzle 40. This nozzle 40 is directed rearwardly with respect to the body section 18, as shown in the drawings, but is not aligned with the longitudinal axis of the marker. Instead, it is laterally offset or "canted" with respect to this axis, so that the force developed by the ejection of gas therethrough will assist the marker in following a path on the surface of the body of water which is not linear, but rather is in the form of a logarithmic spiral. This particular feature of the invention will be discussed in greater detail in connection with FIGS. 5 and 6 of the drawings.

Also contained within the body portion 18 of marker 10 is an electrical transmitter identified generically by the reference numeral 42. It is powered by a chemical cell 44 of any suitable type activated by contact with saline water, which is allowed to enter the cell through an opening closed by a further soluble plug 46. Consequently, after impact of the marker in a body of water, the cell 44 is activated and the transmitter 42 becomes operative. Energy produced thereby is fed through a conductor 48 to an antenna 50 which is normally telescopically recessed within the body portion 18 of the marker, but is extendable following impact either by dissolution of a holding plug (not shown) aligned therewith in the marker body, or by energization of a conventional extending mechanism (not shown) which receives its power upon activation of the cell 44.

Figure 3:
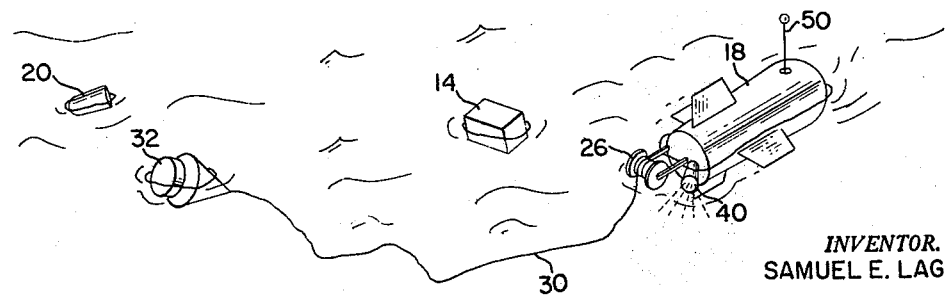
FIG. 3 is a view along the lines of FIG. 1 but illustrating the impact phase of operation of the marker.

Referring now to FIG. 3, there is illustrated the situation which prevails following the launch phase described in connection with FIG. 1. In other words, the marker has now impacted the water, and the frangible aft housing member 20 has broken away along the line 22 to expose the nozzle 40, the reel 26, the lanyard 30 and the sea anchor 32. It will be appreciated that as soon as conditions have stabilized following impact, the marker 10 will assume an upright position, due to the presence of the ballast 24 and the dampening effect of the fins 16. The sea anchor 32, being now free except for its attachment to the reel 26 through the lanyard 30, tends to remain in approximately the same position in the water due to its inherent drag resistance. For a short period of time following impact, the power supply units 34 and 44 are inactive, but as soon as their respective body plugs 36 and 46 dissolve or disintegrate, water comes in contact with the chemical substances comprising the fuels thereof, and the development of energy is initiated. In other words, water flowing through the opening formerly closed by the plug 36 causes a gas under pressure to be generated within the chamber 38, and this gas is ejected through nozzle 40. At the same time, the antenna 50 is raised, and the transmitter 42 begins operation to transmit electromagnetic energy from the beacon.

Figure 4:
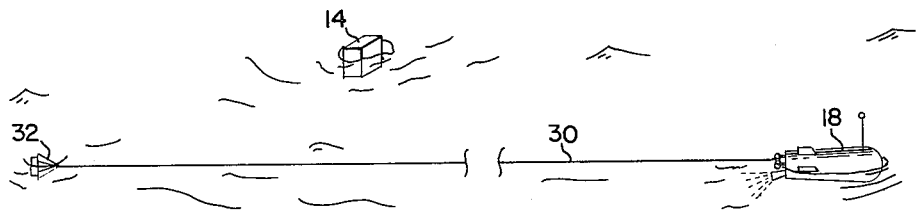
FIG. 4 is a view subsequent in time to FIG. 3, and shows the start of the propulsion phase of the marker's operational cycle.

It has previously been mentioned that the sea anchor 32 offers considerable drag resistance to movement through the water. Consequently, when the marker 10 begins to move due to the propulsive effect of the gas ejected through nozzle 40, the lanyard 30 unwinds from the reel 26 to its full length. This effect may easily be brought about by choosing a proper tension for the reel 26 which is less than the drag resistance of the sea anchor 32. However, once the lanyard 30 has completely unwound from reel 26, movement of the marker 10 straightens out the lanyard 30 and places the latter under a degree of tension due to the opposition offered by the sea anchor 32 to the forward motion of the marker. Once this set of conditions has been established, the various components assume a relationship as shown in FIG. 4, and the so-called propulsion phase of operation commences.

Figure 5:
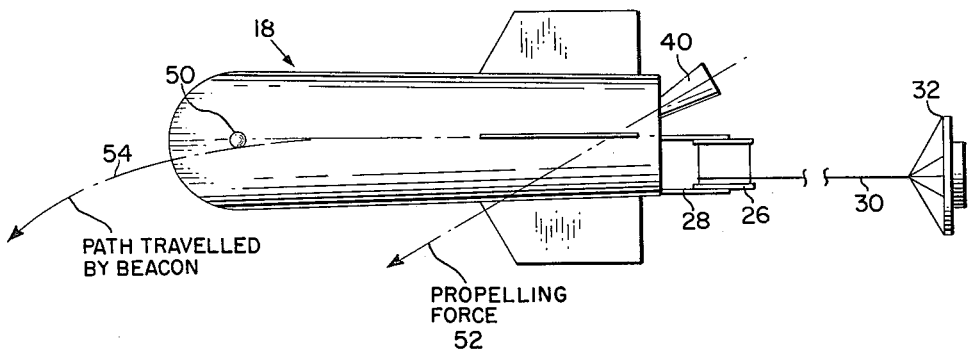
FIG. 5 is a schematic presentation of the two vector forces involved in determining the path followed by the marker during its propulsion phase.

In this phase, the marker 10 is oriented so that the antenna 50 is substantially vertical, and energy is being transmitted therefrom to serve as a guide for surface vessels attempting to locate the object 14 the recovery of which is desired. In order that the marker attach itself to the object and remain therewith for an extended period of time, the arrangement of the present disclosure incorporates means for causing the recovery apparatus to move in approximately a predetermined path upon the surface of the water. Once the lanyard 30 has been placed under tension by the opposing forces respectively developed by the movement of the marker and the drag resistance of the sea anchor 32, the path traveled by the marker will not be straight or linear, but instead will possess a constant curvature in a given direction. This feature will be more clearly understood when it is recalled that the nozzle 40, through which gas under pressure is ejected from the chamber 38 (FIG. 2), does not have an axis parallel to the longitudinal axis of the marker 10, but instead, as mentioned above, this nozzle 40 is angularly offset or canted in a lateral direction as best shown in FIG. 5. This angular displacement of the nozzle 40 is thus in a horizontal plane, so that the propelling force for the marker 10 has a major component indicated by the vector 52. To aid in explaining the mode of operation of the disclosed device, it may be helpful to recognize that the viewpoint in FIG. 5 is taken directly above the marker 10 and hence is, in effect, looking downward on the surface of the water.

In this same figure it will be noted that the effect of the sea anchor 32 is to develop a drag resistance which is exerted on the marker 10 through the taut lanyard 30. In other words, this drag force may be said to be applied to the marker 10 at the point of attachment thereto of the lanyard 30. This point of attachment of the lanyard is to the left of center (looking forward) while the nozzle 40 is positioned to the right of center (also looking forward). Since the thrust developed by the nozzle is along the nozzle axis, the sidewise propelling force of the ejected gas and the lateral drag component of the sea anchor 32 act to reinforce one another.

During the propulsion phase of operation, therefore, the marker 10 moves forward with a trajectory determined by the addition of these two forces, and it has been found that this trajectory (indicated in FIG. 5 by the reference numeral 54) will be generally in the form of a logarithmic spiral. Assuming that the marker unit is originally dropped by the launching aircraft 12 to the proper side of the object to be recovered, it will be now appreciated that the movement of the marker 10 during its propulsion phase will cause the lanyard 30 to encircle the object 14 in an approximately logarithmic path with a gradually decreasing radius. A point will be reached at which the lanyard 30 contacts the object 14 and, due to the continuing propulsive force developed by the power supply of the marker, the lanyard 30 will, in effect, "wind around" the floating object. This result is obtained whenever the object 14 lies at any point within the outer convolution of the spiral path 54 followed by the marker during its propulsion phase. Consequently, it is not necessary that the pilot of the launching aircraft 12 display a high degree of accuracy in determining the time of release of the marker since, as above mentioned, it is only necessary that the marker impact the water at a point within the operating capabilities of the marker, as determined in part by the size and efficiency of its power supply 34 and by the angle at which the nozzle 40 is laterally offset from the longitudinal axis of the marker. It is apparent that this latter factor, together with the degree of drag resistance built in to the sea anchor 32, will govern the degree of curvature of the path 54 and hence the area over which the recovery apparatus will be effective.

Mention has been made above that the fuel supply for developing the marker's propulsive force may consist of some water-activatable substance such as lithium. This compound reacts with saline water to produce hydrogen and steam. If it is desired to impart an initial boost to the marker 10 at the start of its propulsion phase, any suitable device such as, for example, as a delayed-action sodium igniter (not shown) may be utilized.

The power supply 44 for the transmitter 42 may, for example, be a magnesium silver cell, and the plug 46 (as well as the plug 36) may be composed of some soluble compound such as sodium hydrogen carbonate combined with citric acid.

Any suitable type of electronic transmitting apparatus may be incorporated in the marker 10. A particularly suitable arrangement has been found to comprise a modulated 9-megacycle direction-finding type of transmitter which generates pulses at intervals of approximately 10 seconds. Again, the characteristics of the electrical portion of the marker 10 will be determined largely by the recovery requirements imposed by the conditions under which it is intended to operate.

It is important to note that following the launching of the marker 10 from the aircraft 12 on which it is carried (FIG. 1), the tension built into the reel 26 (which may be in the form of a winch brake) is so predetermined that the drag component developed by the sea anchor in the phase of operation illustrated by FIG. 3 is greater than the thrust force developed by the propulsion system of the marker, so that the lanyard 30 will be completely unwound from the reel 26. Following this, the tension imparted to the lanyard causes it to straighten out and assume a condition such as shown in FIG. 4. It is only at this point in time that the sea anchor 32 begins to slowly move through the water under the force imparted thereto through the lanyard 30. It is desired that this lanyard remain a short distance below the surface of the water so as to effectively encircle the object to be recovered, and it has been found in practice that a line having a specific gravity of 1.1 is particularly suitable for this purpose.

It has been additionally ascertained that the body of marker 10 may advantageously be formed of some plastic material having a high impact resistance. This reduces the weight of the marker considerably in comparison with previous recovery devices constructed of some metal such as stainless steel.

Obviously many modifications and variations of the present invention are possible in the light of the above teachings. It is, therefore, to be understood that within the scope of the appended claims the invention may be practiced otherwise than as specifically described.

I claim:

1. A beacon for marking the location of a floating object so as to facilitate the subsequent recovery of the latter, said beacon being adapted for release from an aircraft so as to impact the surface of the water in the vicinity of the floating object, said beacon being of elongated configuration and incorporating a water-activatable source of propelling energy designed to impart a motion to said beacon after impact which motion is at an angle to the longitudinal axis of the beacon, and braking means carried by and extendable from said beacon after impact, the drag resistance to movement through the water offered by said braking means after the complete extension thereof being angularly related in an additive sense to the thrust developed by the said source of propelling energy for the beacon, these two forces combining to cause the movement of said beacon in the water to be nonlinear, with the path described thereby being in the form of a logarithmic spiral substantially enclosing said floating object.

2. A beacon for marking the location of a floating object so as to facilitate the subsequent recovery of the latter, said beacon being adapted for release from an aircraft so as to impact the surface of the water in the vicinity of the floating object, said beacon incorporating a water-activatable source of propelling energy designed to impart a motion to said beacon after impact, and braking means released by said beacon upon impact, said braking means including a reel carried by said beacon, a cable wound upon and attached to said reel, and a sea anchor secured to the outer end of said cable.

3. A beacon for indicating the position of a floating object so as to facilitate the subsequent recovery of the latter, said beacon being adapted for release from an aircraft so as to impact the surface of the water in the vicinity of the floating object, said beacon incorporating means for imparting a propelling force thereto so as to cause the latter to move upon the surface of the water, and means for imposing a drag force on said beacon which is angularly related to the propelling force imparted by said first-mentioned means, whereby the path followed by said beacon during its movement will define a region on the surface of the water within which said object is floating.

4. A beacon according to claim 3 in which said means for imposing a drag force on said beacon includes a lanyard extendable from said beacon, and a sea anchor attached to the outer extremity of said lanyard.

5. A beacon according to claim 3 in which the said means for imparting a propelling force to said beacon includes a water-activatable fuel cell.

6. A beacon according to claim 5 in which said fuel cell is initially activated approximately a predetermined period of time after the beacon has impacted the surface of the water following its release from said aircraft.

7. A beacon according to claim 5 further comprising a radiant energy transmitter carried by said beacon, and means for energizing said transmitter approximately a predetermined period of time after the beacon has impacted the surface of the water following its release from said aircraft, said transmitter-energizing means including a water-activatable cell distinct from that from which the propelling force for said beacon is derived.

8. A beacon according to claim 7, said radiant energy transmitter including an antenna normally carried within said beacon, said antenna being extendible from said beacon after the latter has impacted the surface of the water following its release from said aircraft.

9. A beacon for indicating the position of a floating object so as to facilitate the subsequent recovery of the latter, said beacon being adapted for release from an aircraft so as to impact the surface of the water in the vicinity of the floating object, said beacon incorporating means for developing a propelling force to cause the beacon to move upon the surface of the water, and further means for causing the path followed by said beacon during its movement to be generally in the form of a logarithmic spiral substantially enclosing the floating object to be subsequently recovered, whereby continued movement of said beacon along said path will result in said beacon reaching a position adjacent said object and remaining in such position until subsequent recovery of the latter.

10. A beacon for marking the location of a floating object so as to facilitate the subsequent recovery of the latter, said beacon being adapted for release from a vehicle so as to impact the surface of the water in the vicinity of the floating object, said beacon comprising a torpedo-shaped shell having forward and aft sections joined together by a frangible body portion, the forward section of said shell having a transverse wall closing the rear thereof when said shell sections have separated, a propulsion chamber in the fore section of said beacon, said propulsion chamber having an exhaust nozzle extending into said aft shell section, a reel enclosed within said aft section and secured to the said transverse wall, a lanyard wound on said reel, and a sea anchor attached to the outer extremity of said lanyard, said sea anchor lying within said aft shell portion, whereby, upon impact of said beacon upon a body of water following its release from said vehicle said frangible body portion will break away to result in the separation of said fore and aft shell sections and thereby expose said nozzle, said reel, said lanyard and said sea anchor.

References Cited in the file of this patent
UNITED STATES PATENTS

| | | |
|---|---|---|
| 2,423,859 | Van Karner | July 15, 1947 |
| 2,497,852 | Arenstein | Feb. 21 1950 |
| 2,586,828 | Keeran | Feb. 26, 1952 |
| 2,997,972 | Abrams | Aug. 29, 1961 |